United States Patent [19]

Oppenlaender et al.

[11] Patent Number: 4,537,701

[45] Date of Patent: Aug. 27, 1985

[54] DEMULSIFIERS FOR BREAKING CRUDE-OIL EMULSIONS AND THEIR USE

[75] Inventors: Knut Oppenlaender; Rolf Fikentscher; Egon Buettner; Wilhelmus Slotman; Erich Schwartz, all of Ludwigshafen; Rudolf Mohr, Lampertheim, all of Fed. Rep. of Germany

[73] Assignee: BASF Aktiengesellschaft, Fed. Rep. of Germany

[21] Appl. No.: 330,027

[22] Filed: Dec. 11, 1981

Related U.S. Application Data

[63] Continuation of Ser. No. 899,331, Apr. 24, 1978, abandoned.

[30] Foreign Application Priority Data

May 4, 1977 [DE] Fed. Rep. of Germany ....... 2719978

[51] Int. Cl.$^3$ .................. B01D 17/04; C09K 3/00
[52] U.S. Cl. .................... 252/344; 210/708; 252/358
[58] Field of Search .............. 252/344, 358; 210/708

[56] References Cited

U.S. PATENT DOCUMENTS 3,684,735  8/1972  Oppenlaender et al. ........... 252/342
3,907,701  9/1975  Liebold et al. ...................... 252/344

FOREIGN PATENT DOCUMENTS 2435713  2/1976  Fed. Rep. of Germany.

Primary Examiner—Richard D. Lovering
Attorney, Agent, or Firm—Keil & Weinkauf

[57] ABSTRACT

Petroleum demulsifiers which contain, as the active ingredients, oxyalkylated isoalkylphenol-formaldehyde resins and oxyalkylated polyalkylenepolyamines.

8 Claims, No Drawings

DEMULSIFIERS FOR BREAKING CRUDE-OIL EMULSIONS AND THEIR USE

This is a continuation of application Ser. No. 899,331 filed Apr. 24, 1978 and now abandoned.

The present invention relates to a novel mixture, based on oxyalkylated compounds, for breaking crude-oil emulsions.

It is known, as disclosed, for example, in U.S. Pat. No. 2,964,478, that petroleum emulsions of the oil-in-water type can be broken by means of block copolymers of ethylene oxide and/or 1,2-propylene oxide. Such emulsions consist of water in which fine droplets of oil are dispersed. The compounds disclosed in the said patent are less suitable for breaking inverse emulsions, i.e. water-in-oil emulsions, where fine droplets of water are dispersed in the oil phase. However, breaking the latter type of emulsion, i.e. dehydrating freshly raised crude oil, is a very important problem in the petroleum industry, and numerous attempts to solve it are proposed in a large number of patents and other publications.

The use of the above block polymers for breaking water-in-oil emulsions has already been disclosed. For example, German Laid-Open Application DOS No. 1,545,250 discloses a dehydration process in which various alkylene oxide polymers, and compounds derived therefrom and having hydrophilic end groups, are added to the water-in-oil emulsions; however, as found subsequently, these block polymers do not display their full activity sufficiently rapidly and frequently only display it at elevated temperatures. As is known at the present time, the compounds leave too high a content of residual water, residual salt or residual emulsion, and above all they are only sufficiently effective when applied to a small number of special grades of petroleum.

Depending on their viscosity, the water-in-oil emulsions are frequently heated, at considerable expenditure of energy, and are then treated chemically or electrochemically in order to achieve the low contents of water, salt and possibly residual emulsion, which are essential for further processing.

However, it is desirable to be able to break the water-in-oil emulsions by adding suitable demulsifiers, even at temperatures at which the emulsions are raised, i.e. at from 10° to 40° C., without having to heat them.

Providing a universal demulsifier for all grades of crude oil is impossible because of the different constitution of different crude oils, as shown by experience gathered hitherto.

Nevertheless, it is desirable to provide demulsifiers which are applicable to a plurality of related grades of oil, since otherwise an excessively large number of products would be required for the purpose.

German Laid-Open Application DOS No. 2,227,546 discloses that rapid dehydration of crude oils can be achieved by adding demulsifying compounds based on derivatives of polyalkylene oxides. In this process, a polyalkylenepolyamine which has at least two recurring alkylene imine units in the molecule and in which each nitrogen is completely oxyalkylated with from 10 to 300 alkylene oxide units, is added to the crude oils.

German Laid-Open Application DOS No. 2,435,713 discloses that quaternized polyalkylenepolyamine derivatives of this type are also very effective. German Pat. No. 2,013,820 discloses a mixture of oxyalkylated isoalkylphenol-formaldehyde resins with rosin esters of oxyalkylated polyhydric alcohols as petroleum demulsifiers. The last-mentioned demulsifiers are by themselves satisfactory in many instances, but when they are used with crude-oil emulsions which are difficult to break, the amount of retained water, residual emulsion and residual salt is frequently excessive.

It is an object of the present invention to provide a demulsifier system which breaks the emulsions rapidly and completely at both elevated temperatures and low temperatures and which leaves virtually no residual water and residual salt in the product, and no residual emulsion in the water which is separated off.

It is a further object of the invention to use such demulsifiers for carrying out an advantageous process for breaking crude-oil emulsions, which process gives crude oils which are free from water and salt, and waste water which is substantially free from emulsion.

We have found, surprisingly, that this object is achieved, and that particularly advantageous results are obtained, by a combination of the isoalkylphenol-formaldehyde resins described in German Pat. No. 2,013,820 with the compounds described in German Laid-Open Application DOS No. 2,227,546 and/or German Laid-Open Application DOS No. 2,435,713.

The invention provides a petroleum demulsifier, based on oxyalkylated compounds, which contains, as the active ingredients, (A) from 25 to 75 percent by weight, based on the total active ingredients, of an oxyethylation or oxypropylation product or a mixed oxyethylation-oxypropylation product of an isoalkylphenol-formaldehyde resin which contains per molecule from 3 to 30 benzene nuclei each carrying an oxyalkylated group comprising from 4 to 50 alkylene oxide units and, in the p-position to the oxyalkylate group, an isoalkyl radical of 8 to 12 carbon atoms, and (B) from 75 to 25 percent by weight, based on the total active ingredients, of one or more polyalkylenepolyamines which contain at least two repeating alkylene imine units per molecule and in which each nitrogen is completely oxyalkylated with from 10 to 200 alkylene oxide units. Component (B) may also have quaternized nitrogen atoms, and may indeed be in a completely quaternized form.

The combination not merely results in an addition of the properties of the constituents; instead, petroleum demulsifiers with improved properties, based on a synergistic effect, are obtained. The new demulsifiers are particularly suitable for breaking difficult emulsions and give particularly clean waste water. Because of the extremely small amounts required, the demulsifiers are very economical. They break the emulsions very rapidly and completely, and are effective even at temperatures which are only slightly above the pour point of the crude oil.

The oxyalkylated alkylphenol-formaldehyde resins A preferably have the formula I

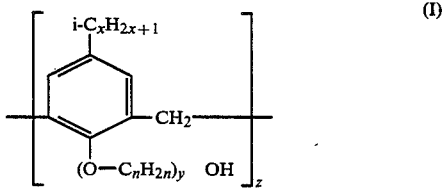

where x is an integer from 8 to 12, n is the integer 2 or 3, y is an integer from 4 to 50 and z is an integer from 3 to 30.

Isoalkylphenols which can be used for condensation with formaldehyde and subsequent oxyalkylation are those which contain an isoalkyl radical of 8 to 12 carbon atoms in the p-position to the phenolic hydroxyl group. Isooctylphenols, isononylphenols and isododecylphenols are preferred. The condensed and oxyalkylated resins contain from 3 to 30, preferably from 4 to 18, phenol nuclei and from 4 to 50 ethylene oxide and/or propylene oxide units per phenol unit. Oxyethylated isooctylphenolformaldehyde resins with from 20 to 30 ethylene oxide units per phenol nucleus and from 4 to 15 phenol nuclei are particularly suitable.

These resins may be manufactured in the conventional manner in the presence of basic catalysts, resulting in condensation products of the resol type. In the presence of acid catalysts, e.g. hydrochloric acid, sulfuric acid, phosphoric acid, p-toluenesulfonic acid or boric acid, novolacs are formed.

The condensates obtained by the two methods are both suitable for use as starting materials for the manufacture of the component A of the mixture.

Both types of condensation may be carried out in an inert reaction medium at from 120° to 150° C. A suitable medium is an organic solvent which is chemically inactive under the reaction conditions and boils at about 150° C., examples being xylene, heavy naphtha and tetralin.

Solvents which are inert under the reaction conditions can remain in the products after the condensation reaction.

These products may be subsequently reacted by conventional methods, for example in a stirred autoclave, in the presence of a basic catalyst, with ethylene oxide and/or propylene oxide at from 120° to 135° C., preferably from 125° to 130° C., under a pressure of from 2 to 12 atmospheres gauge, preferably from 3 to 8 atmospheres gauge.

The manufacture of component A is described in German Pat. No. 2,013,820.

The components B of the mixture are described in German Laid-Open Application DOS No. 2,227,546 which is hereby incorporated by reference. According to said DOS No. 2,227,546 (U.S. Pat. No. 3,907,701) a polyalkylene polyamine having at least 50 and up to 3,000 recurring ethylene imine or propylene imine units, which polyalkylene polyamine is totally alkoxylated at the nitrogen atoms with from 10 to 300 moles of ethylene oxide and/or propylene oxide is used as a demulsifying agent in a process for the rapid dehydration of a crude oil in the form of a saltwater-in-oil emulsion.

These compounds may be obtained by a one-step or multi-step process.

For example, if a two-step process is used, the first step comprises treating the polyalkylene-polyamine, in the presence of from 1 to 50 percent by weight of water, in a pressure vessel provided with a stirrer, at from about 80° to 100° C., with sufficient alkylene oxide that all the valencies of the nitrogen atoms which are used to bond hydrogen atoms undergo reaction, with formation of the corresponding aminoalkanol.

In the second step, water is removed, if appropriate under reduced pressure, from about 0.5 to 2 percent by weight, based on the anhydrous aminoalcohol from the first step, of an alkaline catalyst, e.g. sodium methylate, potassium hydroxide, sodium hydroxide or a basic ion exchanger, are added, and the product is then oxyalkylated further with the required amount of alkylene oxide at from about 125° to 135° C.

If a one-step method is used, the reaction can be carried out by, for example, introducing the total amount of the alkylene oxide in the presence of a water-containing or anhydrous alkaline catalyst of the type defined above, and allowing the reaction to take place completely at from 125° to 135° C. As already mentioned, this may lead to the formation of a substantial proportion of polyalkylene glycol ethers, which however has no substantial effect on the desired properties of the products.

The starting materials for the manufacture of the compounds to be added according to the invention are polyalkylene-polyamines, which may be obtained from ethyleneimine and/or propyleneimine by the conventional method. Preferably, ethyleneimine is used as the starting material. The polyalkylenepolyamines have at least two recurring alkyleneimine units per molecule. For the purposes of the invention, polyethyleneimines comprising from 10 to 3,000 recurring ethyleneimine units are particularly valuable.

The oxyalkylation may be carried out with any common alkylene oxide, e.g. ethylene oxide, 1,2-propylene oxide, 1,2- and 2,3-butylene oxide, isobutylene oxide, styrene oxide or cyclohexene oxide, amongst which propylene oxide and ethylene oxide should be singled out particularly.

The polyalkylenepolyamines can be reacted with the various alkylene oxides by using these either individually or as a mixture and (in the latter case) the reaction can take the form of a block copolymerization or a random copolymerization. If the reaction is carried out in two steps, the alkylene oxide may, in the first step, again be used individually or as a mixture. In the second step, and in the case of a one-step process, the procedure described above is followed.

Preferably, either propylene oxide alone is used, or propylene oxide and ethylene oxide are used and are reacted by block copolymerization. In the latter case, 1,2-propylene oxide is introduced in the first step in order to form the corresponding propanolamine, and thereafter further propylene oxide and, finally, ethylene oxide are introduced, satisfactory results being obtained with a ratio of propylene oxide to ethylene oxide of up to 1:15. However, the converse procedure can also be used, i.e. ethylene oxide can be introduced first, followed by propylene oxide, in which case the ethylene oxide:propylene oxide ratio is advantageously from 20:1 to 1:20. Both embodiments can be carried out in one step or in two steps.

If the reaction is carried out as a random copolymerization, a mixed gas of propylene oxide and ethylene oxide, in which the ratio of these oxides is up to 1:15, can be used.

The possibilities discussed above are in principle also applicable to the other alkylene oxides mentioned and where more than one alkylene oxide is used, the ratio of the oxides can substantially be chosen at will, though where ethylene oxide is present the ratios should conform to the above figures, taking into account the particular molecular weights.

However, with all types of oxyalkylation it is important that the final molecule should contain from 10 to 200, preferably from 60 to 150, alkylene oxide units per nitrogen valency which can be oxyalkylated.

The component B of the mixture can also be employed in the quaternized form.

Suitable quaternizing agents are conventional compounds, for example alkyl halides, e.g. methyl chloride, methyl bromide and ethyl iodide, as well as dimethyl sulfate and similar compounds.

Quaternization is a reaction familiar to all those skilled in the art and will therefore not be described in more detail here.

The demulsifiers of the invention can be prepared by simply mixing the active ingredients or mixing their solutions in solvents, as described later.

In preparing the mixture, component A accounts for from 25 to 75, preferably from 40 to 60, percent by weight and component B from 75 to 25, preferably from 60 to 40, percent by weight.

The demulsifiers are preferably employed as solutions, because they can be metered more readily in this form. Suitable solvents are mixtures of organic solvents (e.g. methanol) with water, or organic solvents, boiling at from 50° to 200° C., employed by themselves, examples being toluene, xylenes, tetrahydrofuran, dioxane, lower alcohols (e.g. methanol), light naphtha fractions falling within the stated boiling range, and the like.

Where solutions are used, as is preferred, they advantageously contain from 0.5 to 50 percent by weight of the active ingredient, i.e. the emulsion breaker. For breaking the emulsions, the solutions are preferably added to the crude oils at the well head. This makes it possible for demulsification to occur at the temperature of the freshly raised water-in-oil emulsion and at a speed such that the emulsion has already broken when it reaches the processing installation. There, it is easily separated into clean oil and brine in a suitable separator, which may or may not be heated, with or without the aid of an electric field.

The demulsifiers are advantageously added to the crude-oil emulsions in amounts of from 1 to 1,000 ppm, preferably from 10 to 100 ppm, based on the weight of the emulsion to be broken, at from 20° to 80° C.

The quick-acting demulsifiers to be used according to the invention may be employed in connection with water-in-oil emulsions containing from about 0.1 to 99 percent by weight of brine. This method of rapid removal of water is applicable to crude-oil emulsions of a great variety of origins, for example those from North Germany, North-West Germany, the U.S.S.R., South America, Africa, the Middle East etc.

The separation of the water-in-oil emulsions takes place extremely rapidly and almost quantitatively within the stated temperature limits, without application of additional heat. Where, in adverse cases, treaters have to be used, the emulsion in general breaks within a few minutes, but in any case within at most from one to two hours.

The Examples which follow relate to the preparation of the demulsifiers and to their use.

(A) Preparation of component A
Oxyalkylated isoalkylphenol-formaldehyde resin
I. Condensation 1,030 parts (5 equivalents) of isooctylphenol are dissolved in 0.7 part by volume of xylene at 40° C. and 500 parts (about 5 equivalents) of 30% strength aqueous formaldehyde solution are then added in the course of 1.5 hours. After 0.04 part by volume (about 0.4 equivalent) of concentrated hydrochloric acid and 3 parts of a pulverulent alkylarylsulfonate, e.g. dodecylbenzenesulfonate, have been added, the mixture is refluxed for 5 hours. After 7 hours, 470 parts of water containing hydrochloric acid are separated off, whilst raising the temperature to 150° C.

Yield: 1,860 parts, acid number: 53, hydroxyl number: 302 (varying from 180 to 320 depending on the degree of condensation).

$\eta$: 84.5 cp (measured on a 50% strength solution in xylene at 20° C. by means of a Höppler falling ball viscometer).

The resin thus obtained contains from 4 to 6 benzene nuclei per molecule.

II. Oxyethylation 127 parts (equivalent to 75 parts of 100% strength product) of the above isooctylphenol-formaldehyde resin in xylene, in the presence of 0.65 part (0.5 percent by weight, based on resin) of sodium hydroxide, are reacted in a stirred autoclave, in the course of from 3 to 5 hours, at a pressure of from 2.5 to 7 atmospheres gauge, with 70 parts of ethylene oxide added in portions. 195 parts (theory: 197 parts) of a medium-brown viscous product, in the form of a 74 percent strength by weight solution in xylene, are obtained.

Acid number of the 100% strength product: 0; hydroxyl number of the 100% strength product: 120 to 135; $\eta$: 16.5 cp (measured on a 50% strength solution in xylene).

The compound thus obtained contains 4.6 alkylene oxide units per benzene nucleus.

(B) Preparation (by the 2-step method) of component B, containing about 100 recurring propylene oxide units per nitrogen valency First step (thermal)

172 g (2 mole equivalents) of a 50% strength aqueous solution of a polyethyleneimine containing about 100 recurring ethyleneimine units are introduced into a V$_2$A stirred autoclave and 116 g (2 moles) of propylene oxide are introduced in portions at 90°–100° C. Time: 3 hours; pressure: 6 atmospheres gauge; temperature: 90°–100° C. The water is then removed by distillation at 100°/15–20 mm Hg.

Second step (catalytic)

15.6 g (0.15 mole) of the product from step 1 and 0.624 g (4 percent by weight, based on 1.) of KOH powder are introduced into a V$_2$A stirred autoclave and thereafter 687 g (11.85 moles) of propylene oxide are introduced in portions at 135° C. and 132 g (3 moles) of ethylene oxide are introduced in portions at 125° C.

Time: 6 hours (PrO); pressure: 6–8 atmospheres gauge; temperature: 135° C. (PrO).

2 hours (EO); 125° C. (EO).

The mixture is then stirred for 4 hours until the pressure remains constant.

The product obtained can be used directly. It consists of the polyethyleneimine which now contains about 80 moles of propylene oxide and 20 moles of ethylene oxide as an adduct.

(C) Use as demulsifiers

Components A and B alone, and a mixture containing 50 percent by weight of each, were tested with petroleums of various origins. For this test, a certain number of ppm of the demulsifier was added to the sample, whilst stirring, and the mixture was then left to stand. The amount of water which had separated off was recorded at various intervals of time, for example after 10, 20 and 30 minutes. Finally, the residual amounts of salt, water and emulsion in the oil phase were determined by the conventional methods.

In order to remove the salt from a refinery feedstock oil, which only contains small residual amounts of emulsion or water, the following method was used: the sample of oil was mixed thoroughly, at an elevated temperature, with 10 percent by weight of water, based on the oil, and with the relevant amount of demulsifier, in a stirred flask. The separation of the water was then observed, after which the procedure described above was followed.

The results are shown in the Tables.

TABLE 1

(demulsification in the field)

| Demulsifier | Amount in ppm | Water separated out, in %, after 2 hrs | 4 hrs | 6 hrs | Residual $H_2O$ % | Residual emulsion % | Residual salt ppm |
|---|---|---|---|---|---|---|---|
| North German crude oil, 42% $H_2O$, stirring experiment at 60° C. | | | | | | | |
| Compound A | 25 | 25 | 30 | 38 | tr | 1.8 | 1,084 |
| Compound B | " | 32 | 35 | 37 | 0 | 1.6 | 1,075 |
| Mixture of A + B | " | 41 | 41 | 42 | 0 | 0.2 | 316 |
| Crude oil from Lower Saxony, 4% $H_2O$, stirring experiment at 60° C. | | | | | | | |
| Compound A | 20 | 0 | tr | 1 | 0 | 0.7 | 988 |
| Compound B | " | 0 | 0 | tr | 0 | 0.2 | 440 |
| Mixture of A + B | " | 2 | 3 | 4 | 0 | 0.1 | 257 |
| Crude oil from the Argentine, 42% $H_2O$, stirring experiment at 60° C. | | | | | | | |
| Compound A | 75 | 29 | 30 | 31 | 0.4 | 11.0 | 4,000 |
| Compound B | " | 30 | 33 | 35 | tr | 1.6 | 1,490 |
| Mixture of A + B | " | 35 | 38 | 39 | 0 | 0.8 | 770 |
| Crude oil from the Argentine, 35% $H_2O$, stirring experiment at 60° C. | | | | | | | |
| Compound A | 75 | 2 | 4 | 10 | 3.0 | 24.0 | — |
| Compound B | " | 2 | 20 | 25 | 2.1 | 10.0 | 949 |
| Mixture of A + B | " | 2 | 30 | 33 | 2.0 | 0 | 266 |
| Crude oil from Peru, 15% $H_2O$, stirring experiment at 60° C. | | | | | | | |
| Compound A | 250 | 4 | 4 | — | 1.0 | 8.0 | 702 |
| Compound B | " | 2 | 5 | — | 2.8 | 3.2 | 419 |
| Mixture of A + B | " | 13 | 14 | — | 0.2 | 0.8 | 98 |
| Crude oil from England (North Sea), 3.2% $H_2O$, stirring experiment at 80° C. | | | | | | | |
| Compound A | 25 | 1 | 1 | 1 | tr | 0 | 79 |
| Compound B | " | tr | tr | tr | tr | 0 | 15 |
| Mixture of A + B | " | 1 | 1 | 1 | tr | 0 | 10 |

A = polyoxyalkylated isoalkylphenol-formaldehyde resin
B = polyoxyalkylated polyalkylenepolyamine
tr = trace

TABLE 2

(refinery desalination)

| Demulsifier | Amount in ppm | Water separated out, in %, after 10 min | 20 min | 30 min | Residual $H_2O$ % | Residual emulsion % | Residual salt ppm |
|---|---|---|---|---|---|---|---|
| Crude oil from Saudi Arabia, with 10% of tapwater | | | | | | | |
| Compound A | 5 | 7 | 9 | 10 | 0 | tr | 18 |
| Compound B | " | 7 | 8 | 10 | 0 | tr | 14 |
| Mixture of A — B | " | 7 | 9 | 10 | 0 | tr | 9 |
| Libyan and Algerian crude oil with 10% of tapwater | | | | | | | |
| Compound A | 3 | 6 | 7 | 9 | 0.1 | 0.2 | 18 |
| Compound B | " | 8 | 8 | 10 | tr | 0.1 | 10 |
| Mixture of A — B | " | 9 | 10 | 10 | 0 | tr | 5 |
| Algerian crude oil with 10% of tapwater | | | | | | | |
| Compound A | 5 | 5 | 7 | 7 | 0.2 | 0.4 | 31 |
| Compound B | " | 6 | 7 | 8 | 0.2 | 0.3 | 29 |
| Mixture of A — B | " | 7 | 9 | 10 | 0.1 | 0.2 | 10 |

A = polyoxyalkylated isoalkylphenol-formaldehyde resin
B = polyoxyalkylated polyalkylenepolyamine
tr = trace

We claim:

1. A petroleum demulsifier which contains, as the active ingredients:
   (A) from 25 to 75 percent by weight, based on the total active ingredients, of an oxyethylation product or a mixed oxyethylation-oxypropylation product of an isoalkylphenol-formaldehyde resin which contains per molecule from 3 to 30 benzene nuclei each carrying an oxyalkylate group comprising from 4 to 50 alkylene oxide units and, in the p-position to the oxyalkylate group, an isoalkyl radical of 8 to 12 carbon atoms, and
   (B) from 75 to 25 percent by weight, based on the total active ingredients, of one or more polyalkylenepolyamines having at least 50 and up to 3,000 recurring ethylene imine or propylene imine units per molecule and in which each nitrogen is completely oxyalkylated with from 10 to 200 alkylene oxide units.

2. The petroleum demulsifier of claim 1, wherein component B is in a completely quaternized form.

3. The petroleum demulsifier of claim 2, wherein the oxyalkylated alkylphenol-formaldehyde resin (component A) has the formula I

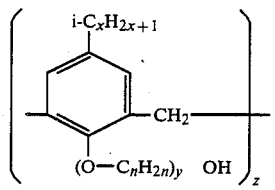

where x is an integer from 8 to 12, n is the integer 2 where the resin is an oxyethylation product or the integers 2 and 3 where the resin is a mixed oxyethylation and oxypropylation product, y is an integer from 4 to 50 and z is an integer from 3 to 30.

4. The petroleum demulsifier of claim 1, wherein the oxyalkylated alkylphenol-formaldehyde resin (component A) has the formula I

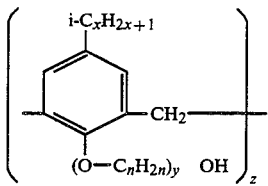

where x is an integer from 8 to 12, n is the integer 2 where the resin is an oxyethylation product or the integers 2 and 3 where the resin is a mixed oxyethylation and oxypropylation product, y is an integer from 4 to 50 and z is an integer from 3 to 30.

5. A process for breaking crude oil emulsions, in which from 1 to 1,000 ppm, based on the weight of the emulsion to be broken, of a petroleum demulsifier is added to the emulsions, at from 20° to 80° C., which demulsifier contains, as the active ingredients, (A) from 25 to 75 percent by weight, based on the total active ingredients, of an oxyethylation product or a mixed oxyethylation-oxypropylation product of an isoalkylphenol-formaldehyde resin which contains per molecule from 3 to 30 benzene nuclei each carrying an oxyalkylate group comprising from 4 to 50 alkylene oxide units and, in the p-position to the oxyalkylate group, an isoalkyl radical of 8 to 12 carbon atoms, and (B) from 75 to 25 percent by weight, based on the total active ingredients, of one or more polyalkylenepolyamines having at least 50 and up to 3,000 recurring ethylene imine or propylene imine units per molecule and in which each nitrogen is completely oxyalkylated with from 10 to 200 alkylene oxide units.

6. The process of claim 5, wherein the demulsifier is employed in the form of a solution, of from 0.5 to 50 percent strength by weight, in an organic solvent of boiling range from 50° to 200° C., selected from the group consisting of toluene, xylenes, tetrahydrofuran, dioxane, lower alcohols, light naphtha fractions and methanol/water mixtures.

7. The process of claim 5, wherein the demulsifier employed is a mixture of which component A has the formula I

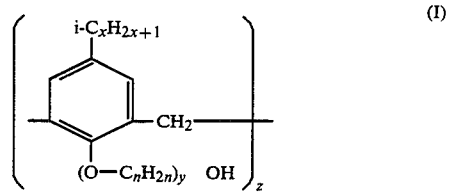

where x is an integer from 8 to 12, n is the integer 2 where the resin is an oxyethylation product or the integers 2 and 3 where the resin is a mixed oxyethylation and oxypropylation product, y is an integer from 4 to 50 and z is an integer from 3 to 30.

8. The process of claim 7, wherein the demulsifier is employed in the form of a solution, of from 0.5 to 50 percent strength by weight, in an organic solvent of boiling range from 50° to 200° C., selected from the group consisting of toluene, xylenes, tetrahydrofuran, dioxane, lower alcohols, light naphtha fractions and methanol/water mixtures.

* * * * *